United States Patent
Athavle

(10) Patent No.: US 10,841,321 B1
(45) Date of Patent: Nov. 17, 2020

(54) SYSTEMS AND METHODS FOR DETECTING SUSPICIOUS USERS ON NETWORKS

(71) Applicant: Veritas Technologies LLC, Mountain View, CA (US)

(72) Inventor: Anand Athavle, San Jose, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 572 days.

(21) Appl. No.: 15/472,231

(22) Filed: Mar. 28, 2017

(51) Int. Cl.
*H04L 29/06* (2006.01)
*G06F 16/2457* (2019.01)

(52) U.S. Cl.
CPC .... *H04L 63/1425* (2013.01); *G06F 16/24575* (2019.01); *G06F 16/24578* (2019.01); *H04L 63/1416* (2013.01); *H04L 63/20* (2013.01)

(58) Field of Classification Search
CPC ............. H04L 63/1425; H04L 63/1416; H04L 63/1408; H04L 63/14; H04L 63/20; G06F 16/24575; G06F 16/24578
USPC ..................................................... 726/22–25
See application file for complete search history.

(56) References Cited

U.S. PATENT DOCUMENTS

| | | | | |
|---|---|---|---|---|
| 6,018,738 A * | 1/2000 | Breese | .................. | G06Q 30/06 706/11 |
| 6,122,628 A * | 9/2000 | Castelli | ................. | G06K 9/6222 |
| 8,181,253 B1 * | 5/2012 | Zaitsev | ............... | H04L 63/1433 726/25 |
| 8,200,770 B2 * | 6/2012 | Ostertag | .......... | G06Q 10/06311 709/207 |
| 8,285,658 B1 * | 10/2012 | Kellas-Dicks | ........... | G06N 5/02 706/20 |
| 8,321,437 B2 * | 11/2012 | Lim | ...................... | G06F 21/604 707/758 |
| 8,732,101 B1 * | 5/2014 | Wilson | ................... | G06N 3/063 706/15 |
| 9,240,010 B2 * | 1/2016 | Aidasani | ................ | G06Q 20/40 |
| 9,516,053 B1 * | 12/2016 | Muddu | ................. | G06F 16/254 |
| 9,710,544 B1 * | 7/2017 | Smith | ..................... | G06F 16/36 |
| 9,787,705 B1 * | 10/2017 | Love | ..................... | G06F 16/358 |
| 9,836,183 B1 * | 12/2017 | Love | ..................... | G06T 11/206 |
| 9,910,856 B2 * | 3/2018 | Borden | ................ | G06F 16/162 |
| 10,009,358 B1 * | 6/2018 | Xie | ........................ | G06F 21/316 |

(Continued)

OTHER PUBLICATIONS

Adam J Rocke, Ronald F. Demara, "Mitigation of Insider Risks using Distributed Agent Detection, Filtering, and Signaling." IJ Network Security, 2(4), (Sep. 12, 2005), pp. 141-149.

(Continued)

*Primary Examiner* — Kambiz Zand
*Assistant Examiner* — Mahabub S Ahmed
(74) *Attorney, Agent, or Firm* — FisherBroyles, LLP

(57) ABSTRACT

The disclosed computer-implemented method for detecting suspicious users on networks may include (1) identifying a first cluster of users based on at least one static attribute of the users; (2) identifying a second cluster of users based on both the at least one static attribute of the users and at least one dynamic attribute of the users, where a respective dynamic attribute weight applied to the at least one dynamic attribute when defining the second clusters is based on network monitoring telemetry; (3) comparing the first cluster with the second cluster to identify an outlying user; and (4) designating the outlying user as suspicious.

20 Claims, 4 Drawing Sheets

(56) References Cited

U.S. PATENT DOCUMENTS

| | | | |
|---|---|---|---|
| 10,015,182 B1* | 7/2018 | Shintre | H04L 63/1441 |
| 10,110,616 B1* | 10/2018 | Xie | H04L 67/30 |
| 10,122,742 B1* | 11/2018 | Oprea | H04L 63/1425 |
| 10,282,636 B2* | 5/2019 | Cheng | G06K 9/6296 |
| 10,467,538 B2* | 11/2019 | Aggarwal | G06Q 50/01 |
| 2002/0188424 A1* | 12/2002 | Grinstein | G06K 9/6253 |
| | | | 702/183 |
| 2003/0023715 A1* | 1/2003 | Reiner | G06F 11/32 |
| | | | 709/224 |
| 2003/0126137 A1* | 7/2003 | McFadden | G06F 16/288 |
| 2003/0154212 A1* | 8/2003 | Schirmer | G06Q 10/107 |
| 2004/0025044 A1* | 2/2004 | Day | H04L 63/1408 |
| | | | 726/23 |
| 2005/0222806 A1* | 10/2005 | Golobrodsky | H04L 63/1416 |
| | | | 702/179 |
| 2006/0271568 A1* | 11/2006 | Balkir | G06Q 10/10 |
| 2006/0294095 A1* | 12/2006 | Berk | G06Q 30/02 |
| 2007/0289017 A1* | 12/2007 | Copeland, III | H04L 41/50 |
| | | | 726/23 |
| 2009/0254572 A1* | 10/2009 | Redlich | G06Q 10/06 |
| 2010/0159438 A1* | 6/2010 | German | G06Q 30/02 |
| | | | 434/433 |
| 2010/0250497 A1* | 9/2010 | Redlich | F41H 13/00 |
| | | | 707/661 |
| 2010/0325148 A1* | 12/2010 | Anderson | G06F 16/3325 |
| | | | 707/769 |
| 2011/0029571 A1* | 2/2011 | Aggarwal | G06F 16/9024 |
| | | | 707/798 |
| 2011/0055072 A1* | 3/2011 | Lee | G06Q 40/02 |
| | | | 705/38 |
| 2011/0099628 A1* | 4/2011 | Lanxner | G06Q 20/4016 |
| | | | 726/22 |
| 2011/0154492 A1* | 6/2011 | Jeong | H04L 63/1416 |
| | | | 726/23 |
| 2012/0054184 A1* | 3/2012 | Masud | G06F 16/285 |
| | | | 707/737 |
| 2012/0137367 A1* | 5/2012 | Dupont | G06F 21/00 |
| | | | 726/25 |
| 2012/0284341 A1* | 11/2012 | Masood | G06Q 50/01 |
| | | | 709/205 |
| 2013/0030861 A1* | 1/2013 | Umamaheswaran | G06Q 10/06 |
| | | | 705/7.28 |
| 2013/0197925 A1* | 8/2013 | Blue | G06Q 50/22 |
| | | | 705/2 |
| 2014/0047091 A1* | 2/2014 | Aggarwal | H04L 45/46 |
| | | | 709/223 |
| 2014/0074926 A1* | 3/2014 | Bosworth | G06Q 50/01 |
| | | | 709/204 |
| 2014/0215618 A1* | 7/2014 | Striem Amit | G06F 21/552 |
| | | | 726/23 |
| 2014/0279775 A1* | 9/2014 | Chu | G06N 5/022 |
| | | | 706/20 |
| 2014/0283026 A1* | 9/2014 | Striem Amit | H04L 63/1416 |
| | | | 726/22 |
| 2015/0007319 A1* | 1/2015 | Antonov | G06F 21/56 |
| | | | 726/23 |
| 2015/0058320 A1* | 2/2015 | Zheng | G06F 21/6245 |
| | | | 707/722 |
| 2015/0070585 A1* | 3/2015 | Sharif-Ahmadi | G08C 17/02 |
| | | | 348/564 |
| 2015/0081881 A1* | 3/2015 | Eaton | G06K 9/6219 |
| | | | 709/224 |
| 2015/0096023 A1* | 4/2015 | Mesdaq | H04L 63/145 |
| | | | 726/23 |
| 2015/0235152 A1* | 8/2015 | Eldardiry | H04L 63/1425 |
| | | | 705/7.28 |
| 2015/0242406 A1* | 8/2015 | Singh | G06Q 50/01 |
| | | | 707/610 |
| 2015/0286707 A1* | 10/2015 | Levitan | G06F 16/9027 |
| | | | 707/737 |
| 2015/0363644 A1* | 12/2015 | Wnuk | G06K 9/6215 |
| | | | 382/103 |
| 2015/0373039 A1* | 12/2015 | Wang | H04L 63/1425 |
| | | | 726/23 |
| 2016/0015307 A1* | 1/2016 | Kothuri | A61B 5/167 |
| | | | 702/19 |
| 2016/0019298 A1* | 1/2016 | Brodie | G06F 16/9535 |
| | | | 707/734 |
| 2016/0057246 A1* | 2/2016 | Krishnaiahsetty | G06Q 50/01 |
| | | | 709/204 |
| 2016/0080392 A1* | 3/2016 | Dunne | H04L 63/1408 |
| | | | 726/1 |
| 2016/0080404 A1* | 3/2016 | Kohout | H04L 63/1425 |
| | | | 726/23 |
| 2016/0149941 A1* | 5/2016 | Thakur | H04L 63/1425 |
| | | | 726/23 |
| 2016/0170996 A1* | 6/2016 | Frank | G06F 16/24578 |
| | | | 707/748 |
| 2016/0180556 A1* | 6/2016 | Deng | G06T 11/206 |
| | | | 345/440 |
| 2016/0203316 A1* | 7/2016 | Mace | G06F 21/316 |
| | | | 726/23 |
| 2016/0219065 A1* | 7/2016 | Dasgupta | H04L 63/1441 |
| 2016/0226901 A1* | 8/2016 | Baikalov | H04L 63/1433 |
| 2016/0350294 A1* | 12/2016 | Nefedov | G06F 16/248 |
| 2016/0359697 A1* | 12/2016 | Scheib | H04L 43/045 |
| 2016/0360382 A1* | 12/2016 | Gross | G06F 3/0488 |
| 2017/0017661 A1* | 1/2017 | Milton | G06Q 30/02 |
| 2017/0061322 A1* | 3/2017 | Chari | H04L 63/1425 |
| 2017/0063909 A1* | 3/2017 | Muddu | G06F 16/254 |
| 2017/0078315 A1* | 3/2017 | Allen | G06F 16/285 |
| 2017/0104756 A1* | 4/2017 | Rosenthal | H04L 63/20 |
| 2017/0109014 A1* | 4/2017 | Gindi | G06F 16/252 |
| 2017/0124298 A1* | 5/2017 | Baldwin | G06Q 30/0635 |
| 2017/0124478 A1* | 5/2017 | Baradaran | H04L 63/1425 |
| 2017/0139921 A1* | 5/2017 | Ball | G06F 16/24578 |
| 2017/0142119 A1* | 5/2017 | Zhang | H04L 67/306 |
| 2017/0193229 A1* | 7/2017 | RoyChowdhury | G06F 21/564 |
| 2017/0237773 A1* | 8/2017 | Wallace | H04L 63/1425 |
| | | | 726/22 |
| 2017/0277727 A1* | 9/2017 | Chen | G06F 21/56 |
| 2017/0279829 A1* | 9/2017 | Vasseur | G06N 20/00 |
| 2017/0286671 A1* | 10/2017 | Chari | G06F 21/552 |
| 2017/0310691 A1* | 10/2017 | Vasseur | H04L 63/1458 |
| 2018/0004948 A1* | 1/2018 | Martin | H04L 63/1425 |
| 2018/0027002 A1* | 1/2018 | Rodeck | G06F 16/287 |
| | | | 726/23 |
| 2018/0060149 A1* | 3/2018 | Flyax | G06F 11/0769 |
| 2018/0077182 A1* | 3/2018 | Sartran | H04L 63/1425 |
| 2018/0083994 A1* | 3/2018 | Armstrong | H04L 63/1425 |
| 2018/0089444 A1* | 3/2018 | Kenthapadi | G06F 21/6254 |
| 2018/0096052 A1* | 4/2018 | M | G06F 3/0482 |
| 2018/0107528 A1* | 4/2018 | Vizer | G06F 17/40 |
| 2018/0146253 A1* | 5/2018 | Louboutin | H04N 21/4667 |
| 2018/0167402 A1* | 6/2018 | Scheidler | H04L 63/1416 |
| 2018/0183821 A1* | 6/2018 | Schneider | G06F 16/285 |
| 2018/0189338 A1* | 7/2018 | Kim | G06F 9/4843 |
| 2018/0219875 A1* | 8/2018 | Bania | H04L 63/14 |
| 2018/0219888 A1* | 8/2018 | Apostolopoulos | |
| | | | G06F 16/9024 |
| 2018/0234443 A1* | 8/2018 | Wolkov | G06K 9/6284 |
| 2018/0248895 A1* | 8/2018 | Watson | G06N 3/08 |
| 2018/0254064 A1* | 9/2018 | Gonzalez-Banos | |
| | | | G06K 9/00751 |
| 2018/0255084 A1* | 9/2018 | Kotinas | G06K 9/6222 |
| 2018/0268015 A1* | 9/2018 | Sugaberry | G06N 3/063 |
| 2018/0288063 A1* | 10/2018 | Koottayi | G06F 21/552 |
| 2019/0108249 A1* | 4/2019 | Elkherj | G06F 16/248 |
| 2019/0158517 A1* | 5/2019 | Muddu | H04L 63/1416 |
| 2019/0278775 A1* | 9/2019 | Saperstein | H04L 63/1425 |
| 2019/0335133 A1* | 10/2019 | Sharif-Ahmadi | |
| | | | H04N 21/25891 |

OTHER PUBLICATIONS

Alexander Liu, Cheryl Martin, Tom Hetherington, Sara Matzner, "A comparison of system call feature representations for insider threat detection." Information Assurance Workshop, 2005, IAW '05, Pro-

(56) References Cited

OTHER PUBLICATIONS ceedings from the Sixth Annual IEEE SMC (2005) pp. 340-347, IEEE.

G. B. Magklaras, S. M. Furnell "Insider threat prediction tool: Evaluating the probability of IT misuse." Computers & Security, vol. 21, No. 1, (2001), pp. 62-73.

Hoda Eldardirym, Evgeniry Bart, Juan Liu, John Hanley, Bob Price, Oliver Brdiczka, "Multi-Domain Information Fusion for Insider Threat Detection." Security and Privacy Workshops (SPW), 2013 IEEE, (2013), pp. 45-51, San Francisco: IEEE.

Julie Fitzgerald, Kathryn Laskey, Ghazi Alghamdi, Xun Wang, Daniel Barbara, Tom Shackelford, Ed Wright, "Detecting Threatening Behavior Using Bayesian Networks." Proceedings of the 13th Conference on Behavioral Representation in Modeling and Simulation (May 17, 2004).

Miltiadis Kandias, Alexios Mylonas, Nikos Virvilis, Marianthi Theoharidou, Dimitris Grizalis "An insider threat prediction model. In Trust, privacy and security in digital business." International Conference on Trust, Privacy and Security in Digital Business 2010. Lecture Notes in Computer Science, vol. 6264, (2010), pp. 26-37, Springer, Berlin, Heidelberg.

Spitzer, Lance, "Honeypots: catching the insider threat." 19th Annual Computer Security Applications Conference Proceedings. (2003), pp. 170-179, IEEE.

Sunu Mathew, Shambhu Upadhyaya, Duc Ha, Hung Q. Ngo, "Insider abuse comprehension through capability acquisition graphs." 11th International Conference on Information Fusion, (2008), pp. 1-8, IEEE.

Verizon, "2015 Data Breach Investigations Report." (2015) Retrieved Sep. 25, 2015, from Verizon Enterprise Solutions: http://www.verizonenterprise.com/DBIR/2015/.

Matt Wolff, "Unsupervised Methods for Detecting a Malicious Insider." Proceedings of the 7th International Information Systems for Crisis Response and Management (ISCRAM) Conference, (2010).

Bradley Wood, "An Insider Threat Model for Adversary Simulation." SRI International, Research on Mitigating the Insider Threat to Information Systems—#2: Proceedings of a Workshop Held by RAND, (2000).

Laurence Alison, Alasdair Goodwill, Louise Almond, Claudia Van Den Heuvel, Jan Winter, "Pragmatic solutions to offender profiling and behavioral investigative advice." Legal and Criminological Psychology 2010, 15, 115-132, (2010), British Psychological Society, Leicester, UK.

\* cited by examiner

SYSTEMS AND METHODS FOR DETECTING SUSPICIOUS USERS ON NETWORKS

BACKGROUND

Some of the most insidious threats to computer networks come from the malicious acts of insiders or other trusted users that have authorized access to networks. Unfortunately, in some circumstances, this trust may be misplaced, and rogue insiders may engage in malicious activity such as making unauthorized modifications to electronic data, performing unauthorized deletions of electronic data, stealing electronic data, using electronic data or intellectual property in an unauthorized manner, etc.

Detecting insiders' malicious activities is particularly difficult, as insiders often must access networks in order to perform tasks relating to their employment. Conventional techniques for detecting malicious insider activity often compare users' activity with their own access trends. However, users may easily establish trends without generating any suspicion. Moreover, without enough user access history (which is often the case with new users), comparing users' current access behavior with an inadequate history may not reveal anything suspicious. In addition, conventional techniques that look at insiders' individual acts may generate a tremendous number of false positives when insiders properly engage in authorized activities. For example, insiders assigned to new tasks may properly access sensitive files for the first time, potentially triggering false positives.

The instant disclosure, therefore, identifies and addresses a need for improved systems and methods for detecting suspicious users on networks.

SUMMARY

As will be described in greater detail below, the instant disclosure describes various systems and methods for detecting suspicious users on networks. In some embodiments, a method for detecting suspicious users on networks may include: (1) identifying a first cluster of users based on at least one static attribute of the users; (2) identifying a second cluster of users based on both the static attribute of the users and at least one dynamic attribute of the users, where a respective dynamic attribute weight applied to the dynamic attribute when defining the second clusters is based on network monitoring telemetry; (3) comparing the first cluster with the second cluster to identify an outlying user; and (4) designating the outlying user as suspicious.

In some examples, identifying the first cluster further includes calculating connection weights between the users by adding respective static attribute weights of two users when the two users have the same static attribute weights for a respective static attribute. In addition, identifying the second cluster may further include adjusting the connection weights by: (A) multiplying a respective connection weight between the two users by a predetermined factor when the respective dynamic attribute weight of the two users is within a predetermined range and (B) dividing the respective connection weight between the two users by the predetermined factor when the respective dynamic attribute weight of the two users is outside of the predetermined range. In some examples, the method may also include performing at least one security action in response to designating the outlying user as suspicious.

In some examples, the static attribute may be based on a user profile. This user profile may include, for example: (A) a job title, (B) a job grade, (C) a job location, (D) a job department, (E) a country, and/or (E) a primary language.

In some embodiments, the dynamic attribute may be based on user behavior. This user behavior may include, for example: (A) a number of files accessed, (B) a number of file permissions, (C) a number of file reads, (D) a number of file writes, (E) a number of file creates, (F) a number of file deletes, (G) a number of file permission changes, (H) a number of file renames, (I) a number of files to which the user has access, (J) a number of internet protocol addresses that the user accesses, and/or (K) a number of files that the user owns.

In some examples, a system for detecting suspicious users on networks may include several modules stored in memory, including an identifying module, stored in memory, that identifies a first cluster of users based on at least one static attribute of the users, as well as that identifies a second cluster of users based on both the static attribute of the users and at least one dynamic attribute of the users, where a respective dynamic attribute weight applied to the dynamic attribute when defining the second clusters is based on network monitoring telemetry. The system may also include a comparing module, stored in memory, that compares the first cluster with the second cluster to identify an outlying user. In addition, the system may include a designating module, stored in memory, that designates the outlying user as suspicious. Finally, the system may include at least one physical processor that executes the identifying module, the comparing module, and the designating module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to: (1) identify a first cluster of users based on at least one static attribute of the users; (2) identify a second cluster of users based on both the static attribute of the users and at least one dynamic attribute of the users, where a respective dynamic attribute weight applied to the at least one dynamic attribute when defining the second clusters is based on network monitoring telemetry; (3) compare the first cluster with the second cluster to identify an outlying user; and (4) designate the outlying user as suspicious.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
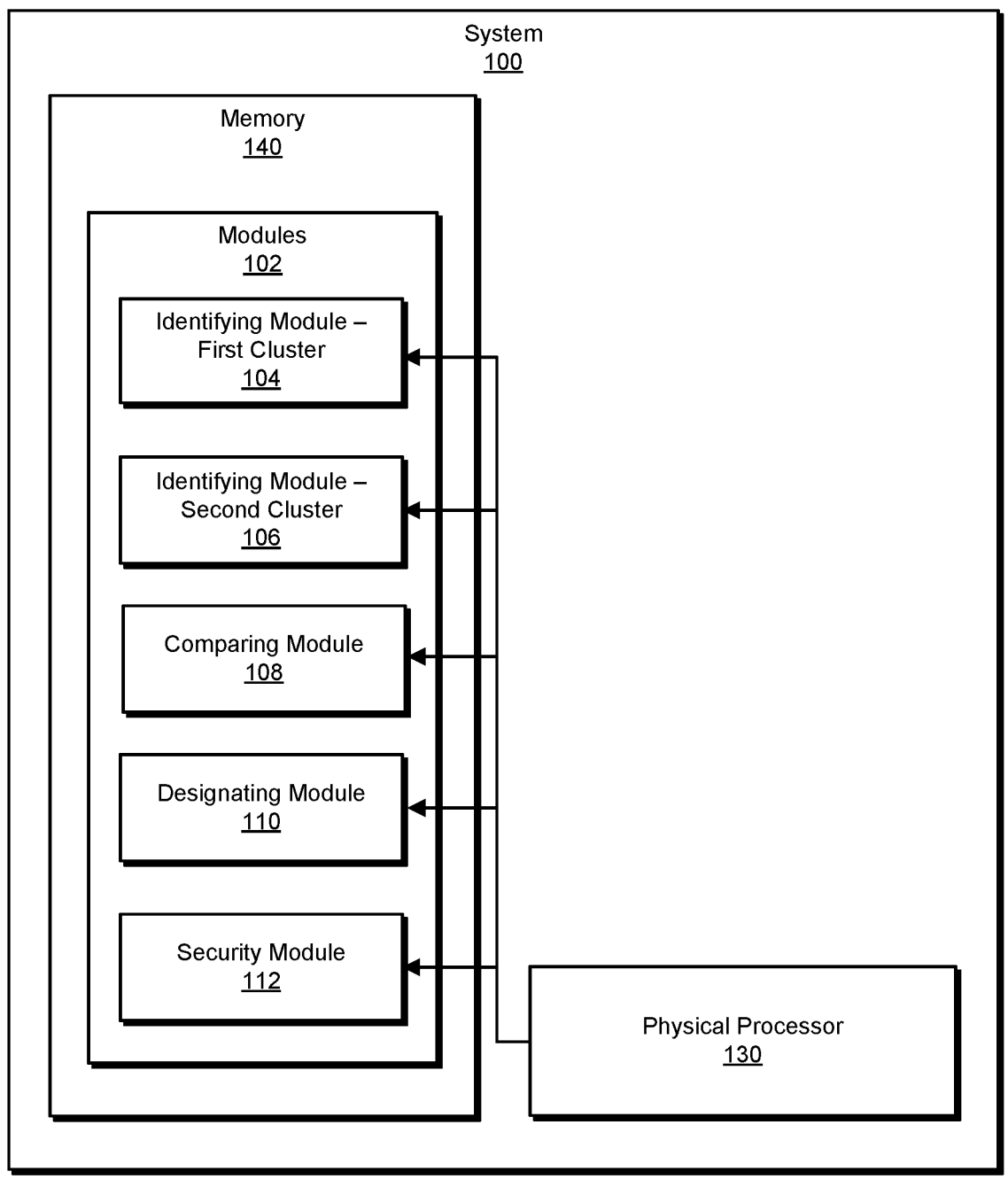
FIG. 1 is a block diagram of an example system for detecting suspicious users on networks.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting suspicious users on networks. As will be described in greater detail below, these systems may, by clustering users based on various static and dynamic attributes, identify community structures in very large networks that may help in identifying users engaging in malicious or otherwise unauthorized activity. In one example, the disclosed systems may accomplish this by (1) clustering users based on static attributes, (2) clustering users based on static as well as dynamic attributes, and then (3) comparing the distances between the locations of each user in the two clusters. By doing so, the systems and methods described herein may both advantageously identify outlying users engaging in malicious or unauthorized activity and minimize the potential for false positives.

Figure 2:
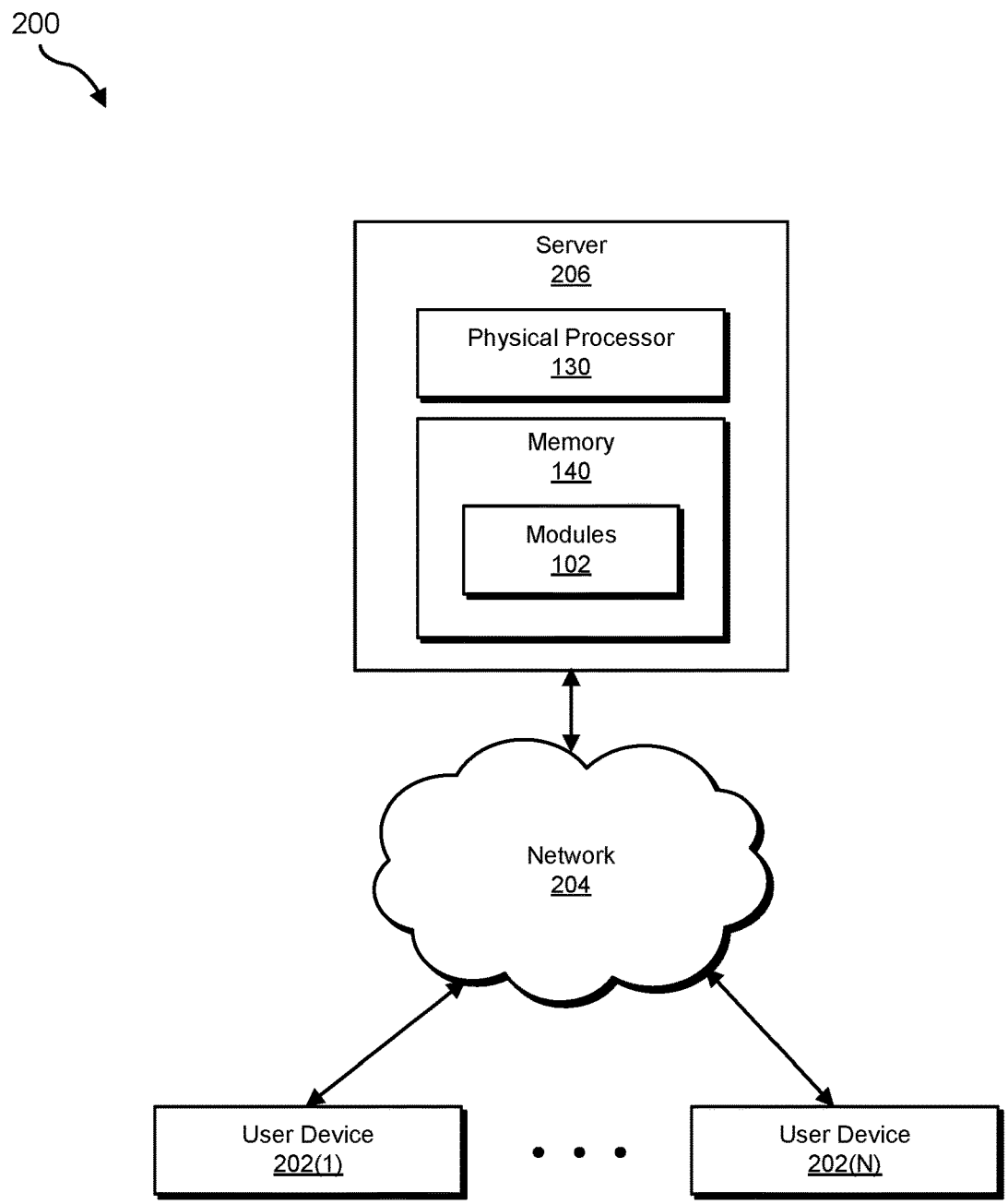
FIG. 2 is a block diagram of an additional example system for detecting suspicious users on networks.

The following will provide, with reference to FIGS. 1-2, detailed descriptions of example systems for detecting suspicious users on networks. Detailed descriptions of corresponding computer-implemented methods will also be provided in connection with FIG. 3-4.

FIG. 1 is a block diagram of an example system 100 for detecting suspicious users on networks. As illustrated in this figure, example system 100 may include one or more modules 102 for performing one or more tasks. As will be explained in greater detail below, modules 102 may include an identifying module 104 that identifies a first cluster of users, an identifying module 106 that identifies a second cluster of users, a comparing module 108 that compares the first cluster with the second cluster to identify an outlying user, a designating module 110 that designates the outlying user as suspicious, and a security module 112 that performs a security action in response to identifying the suspicious user. Although illustrated as separate elements, one or more of modules 102 in FIG. 1 may represent portions of a single module or application. For example, identifying module 104 may be combined with identifying module 106.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., user devices 202(1)-(N) and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting suspicious users on networks. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a plurality of user devices 202(1)-(N) in communication with a server 206 via a network 204. In one example, all or a portion of the functionality of modules 102 may be performed by server 206 and/or any other suitable computing system. As will be described in greater detail below, one or more of modules 102 from FIG. 1 may, when executed by at least one processor of server 206, enable server 206 to detect suspicious users on networks.

Server 206 generally represents any type or form of computing device capable of executing instructions and/or performing tasks related to detecting suspicious network users. Examples of server 206 include, without limitation, file servers, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between user devices 202(1)-(N) and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

User devices 202(1)-(N) generally represent any type or form of computing device capable of accessing network 206, such as devices that authorized users, such as insiders, may use to access server 206. Examples of user devices 202(1)-(N) may include, without limitation, laptops, tablets, desktops, servers, cellular phones, Personal Digital Assistants (PDAs), multimedia players, embedded systems, wearable devices (e.g., smart watches, smart glasses, etc.), smart vehicles, Internet-of-Things devices (e.g., smart appliances, etc.), gaming consoles, variations or combinations of one or more of the same, or any other suitable computing device.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
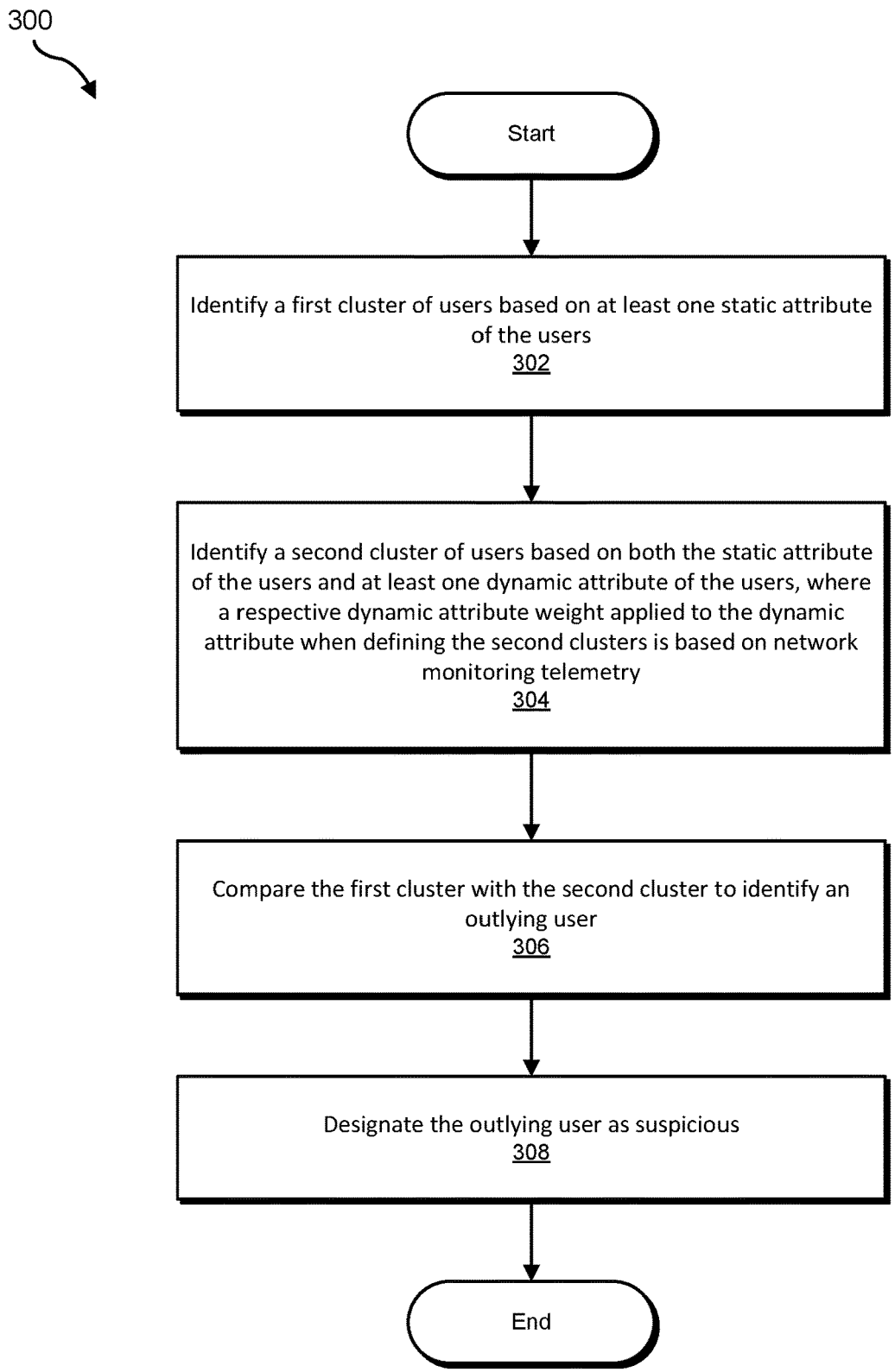
FIG. 3 is a flow diagram of an example method for detecting suspicious users on networks.

FIG. 3 is a flow diagram of an example computer-implemented method 300 for detecting suspicious users on networks. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify a first cluster of users based on at least one static attribute of the users. For example, identifying module 104 may, as part of or server 206 in FIG. 2, identify a first cluster of users based on at least one static attribute of the users.

The term "static attributes," as used herein, generally refers to any type or form of user characteristic that generally does not change over time. Static attributes may include job titles, job grades, job locations, job departments, countries in which users work, and users' primary language. In some examples, static attributes may be based on users' profiles.

The systems described herein may perform step 302 in a variety of ways. In some examples, identifying module 104 may identify the first cluster by calculating connection weights between the users by, for each set of users that have the same static attribute weights for a respective static attribute, adding respective static attribute weights for the users in question.

The term "static attribute weights," as used herein, generally refers to any type or form of numerical weight assigned to a corresponding static attribute. In some examples, static attribute weights may be assigned based on how defining static attributes are in terms of profiling users. For example, the static attributes "department" or "job title" may be more "defining" static attributes than the static attributes "country" or "primary language."

The following is a non-limiting example of step 302. In this example, there are four users: U1, U2, U3 and U4. Each user has static attributes including a respective department, respective job grade, and respective location. The users' static attributes are:

|    | Department  | Job Grade         | Location      |
|----|-------------|-------------------|---------------|
| U1 | Engineering | Software Engineer | Pune          |
| U2 | Engineering | Software Engineer | Mountain View |
| U3 | InfoDev     | Info Developer    | Pune          |
| U4 | Engineering | SQA Engineer      | Pune          |

In this example, each static attribute has an assigned static attribute weight. For example, the department static attribute has an assigned weight of 50, the job grade static attribute has an assigned weight of 20, and the location static attribute has an assigned weight of 5.

In this example, identifying the first cluster includes calculating connection weights between the users by adding respective static attribute weights of two users when the two users have the same static attribute weights for a respective static attribute. Thus:

for U1-U2, the connection weight is 50+20+0=70.
for U1-U3, the connection weight is 0+0+5=5.
for U1-U4, the connection weight is 50+0+5=55.
for U2-U3, the connection weight is 0+0+0=0.
for U2-U4, the connection weight is 50+0+0=50.
for U3-U4, the connection weight is 0+0+5=5.

Accordingly, users U1, U2, and U4 have strong connection weights, and form a first cluster.

As illustrated in FIG. 3, at step 304 one or more of the systems described herein may identify a second cluster of users based on both the static attribute of the users and at least one dynamic attribute of the users. For example, identifying module 106 may, as part of server 206 in FIG. 2, identify a second cluster of users based on both the static attribute of the users and at least one dynamic attribute of the users. In this example, a respective dynamic attribute weight applied to the dynamic attribute when defining the second cluster may be based on network monitoring telemetry.

The term "dynamic attributes," as used herein, generally refers to any type or form of user characteristic that can change over time. In some examples, dynamic attributes may be based on user behavior. Examples of user behavior may include the number of files accessed by a user, the number of file permissions granted to a user, the number of file reads performed by a user, the number of file writes performed by a user, the number of files created by a user, the number of files deleted by a user, the number of file permission changes performed in connection with a user, the number of file rename operations performed by a user, the number of files to which the user has access, the number of internet protocol addresses that a user accesses, and/or the number of files that a user owns.

The systems described herein may perform step 304 in a variety of ways. In some embodiments, identifying module 106 may identify the second cluster by, when the respective dynamic attribute weights for a set of users fall within a predetermined range, adjusting their connection weights by multiplying respective connection weights between the users by a predetermined factor. Similarly, identifying module 106 may, when the respective dynamic attribute weights for a set of users falls outside of this predetermined range, adjust their connection weights by dividing respective connection weights between the users by a predetermined factor.

The term "dynamic attribute weights," as used herein, generally refers to any type or form of numerical weight value that may be assigned to a corresponding dynamic attribute. For example, the dynamic attribute "number of files accessed by each user" may be assigned a dynamic attribute weight of 1043 if the user in question has accessed 1043 files.

As an example, and continuing with the non-limiting example from step 302 above, consider the dynamic attribute "number of files accessed by each user." In this example, this dynamic attribute has respective dynamic attribute weights for each user as follows:

|    | Department  | Job Grade         | Location      | Number of files |
|----|-------------|-------------------|---------------|-----------------|
| U1 | Engineering | Software Engineer | Pune          | 1043            |
| U2 | Engineering | Software Engineer | Mountain View | 1855            |
| U3 | InfoDev     | Info Developer    | Pune          | 30              |
| U4 | Engineering | SQA Engineer      | Pune          | 32530           |

In this example, the systems described herein may identify the second cluster based on a scale difference between a number of files accessed by U1, U2, U3, and U4. Identifying the second cluster either increases or reduces connection weights. For example, the systems described herein may increase connection weights by multiplying by a factor of 10 or reduce connection weights by dividing by 10 based on whether the dynamic attribute weights in question match the same log 10 base (rounded down to the closest integer). In this example, the log 10 bases for each of the users would be as follows:

U1: $\lfloor \log_{10}(1043) \rfloor = 3$
U2: $\lfloor \log_{10}(1855) \rfloor = 3$
U3: $\lfloor \log_{10}(30) \rfloor = 1$
U4: $\lfloor \log_{10}(32530) \rfloor = 4$ As a result, U1 and U2 have the same log 10 base of 3. Thus, the connection weights between U1 and U2 will be increased by a factor of 10, and all other connections will be reduced by a factor of 10. Accordingly, the adjusted connection weights would be:

U1-U2=70*10=700
U1-U3=5/10=0.5
U1-U4=55/10=5.5
U2-U3=0/10=0
U2-U4=50/10=5
U3-U4=5/10=0.5

Thus, users U1 and U2 have strong connection weights, and form a second cluster.

As illustrated in FIG. 3, at step 306 one or more of the systems described herein may compare the first cluster with the second cluster to identify an outlying user. For example, comparing module 108 may, as part of server 206 in FIG. 2, compare the first cluster with the second cluster to identify an outlying user.

The term "outlying users," as used herein, generally refers to users whose locations change distances by a threshold amount. In some examples, the systems described herein may identify outlying users by comparing the distances between the locations of each user in the first cluster and the second cluster with a threshold distance.

The systems described herein may perform step 306 in a variety of ways. Continuing with the non-limiting example from above, users U1, U2, and U4 form the first cluster, and users U1 and U2 form the second cluster. In this example, user U4 represents an outlying user whose location changes between the first cluster and the second cluster by a significant amount.

As illustrated in FIG. 3, at step 308 one or more of the systems described herein may designate outlying users as suspicious. For example, designating module 110 may, as part of server 206 in FIG. 2, designate user U4 from the non-limiting example above as suspicious since this user's location changes between the first cluster and the second cluster by a significant amount.

In some examples, the systems described herein may perform at least one security action in response to designating the outlying user as suspicious. For example, in response to designating user U4 from the example above as suspicious, security module 112 may block a variety of operations requested by the suspicious user, including, without limitation, requests to grant privileges to an application, requests to grant access to files, requests to authorize the suspicious user to perform an operation on server 206, requests to authorize a transaction (such as a fraudulent bank transaction), requests to access local or remote computing resources (such as websites, files, or removable storage devices), etc. As used herein, the term "privileges" may include rights to access system data, resources, features, or information outside of applications' traditionally limited access. For example, applications may request read/write access to storage containing confidential data.

Figure 4:
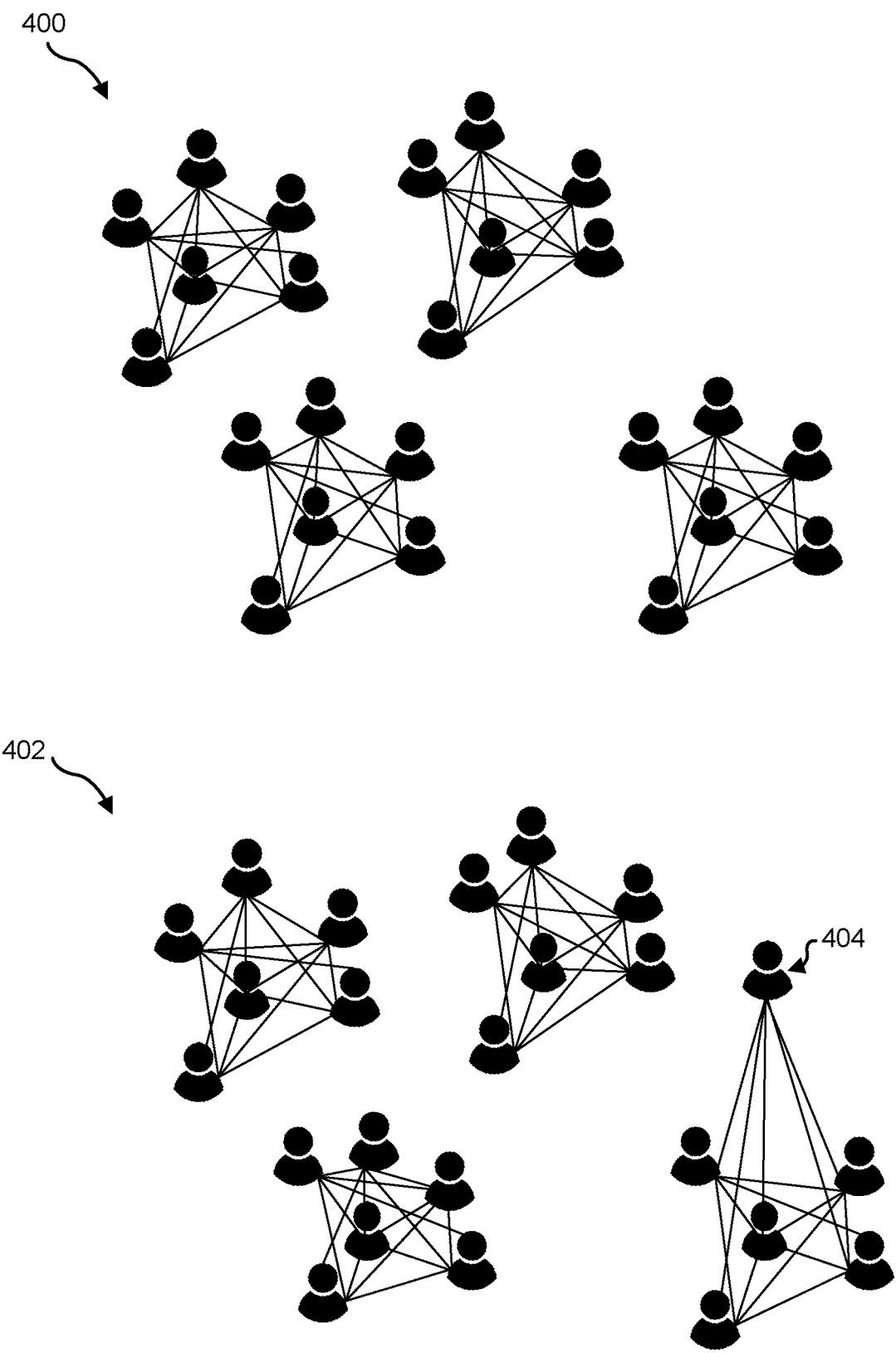
FIG. 4 depicts example first and second clusters and an example outlying user.

FIG. 4 depicts example first clusters of users 400, example second clusters of users 402, and an example outlying user 404. The disclosed systems and methods may identify example outlying user 404 as being an outlying user. Since outlying user 404 has dynamic attribute weights at different scales, and hence stands out in FIG. 4, this indicates that dynamic attributes of user 404 deviate from other users with similar static attributes. As such, the disclosed systems may identify outlying user 404 as suspicious, and perform some form of security action in response. For ease of reference in FIG. 4, connections between a first user and a second user are not drawn as passing through a third user—these connections are instead drawn to a head of the first user and thus bypass the third user.

As explained above, the disclosed systems and methods may detect suspicious users on networks by identifying a first cluster of users based on static attributes such as department, cost code, job title, etc. The disclosed systems and methods may then identify a second cluster of users in terms of dynamic attributes and identify if users are "far off," in the second cluster, from where the users should be in the first cluster. Outlying (and thus suspicious) users may be accurately identified by comparing the distance between the locations of each user in the two clusters. By doing so, the systems and methods described herein may advantageously catch insiders engaging in malicious or otherwise unauthorized activity, while minimizing false positives.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures may be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting suspicious users on networks, at least a portion of the method being performed by a computing device comprising at least one processor, the method comprising:
   calculating connection weights between users by adding respective static attribute weights of the users when the users have the same static attribute weights;
   identifying a first cluster of users based on the calculated connection weights;
   identifying a second cluster of users based on both at least one static attribute of the users and at least one dynamic attribute of the users, wherein the identifying the second cluster of users comprises:
      adjusting the calculated connection weight between a set of users to create an adjusted connection weight by:
         multiplying the calculated connection weight between the set of users by a predetermined factor when a respective dynamic attribute weight of the set of users is within a predetermined range; and
         dividing the calculated connection weight between the set of users by the predetermined factor when the respective dynamic attribute weight of the set of users is outside of the predetermined range; and
      identifying the second cluster of users based on the adjusted connection weight;
   comparing the first cluster with the second cluster to identify an outlying user; and
   designating the outlying user as suspicious.

2. The computer-implemented method of claim 1, wherein the comparing further comprises comparing distances between locations of each user in the first cluster and the second cluster to identify the outlying user.

3. The computer-implemented method of claim 1, wherein the at least one static attribute is based on a user profile.

4. The computer-implemented method of claim 3, wherein the user profile comprises at least one of:
- a job title;
- a job grade;
- a job location;
- a job department;
- a country; and
- a primary language.

5. The computer-implemented method of claim 1, wherein the at least one dynamic attribute is based on user behavior.

6. The computer-implemented method of claim 5, wherein the user behavior comprises at least one of:
- a number of files accessed;
- a number of file permissions;
- a number of file reads;
- a number of file writes;
- a number of file creates;
- a number of file deletes;
- a number of file permission changes;
- a number of file renames;
- a number of files to which the user has access;
- a number of internet protocol addresses that the user accesses; and
- a number of files that the user owns.

7. The computer-implemented method of claim 1, further comprising performing at least one security action in response to designating the outlying user as suspicious.

8. A system for detecting suspicious users on networks, the system comprising:
an identifying module, stored in memory, that:
   calculates connection weights between users by adding respective static attribute weights of the users when the users have the same static attribute weights;
   identifies a first cluster of users based on the calculated connection weights; and
   identifies a second cluster of users based on both the at least one static attribute of the users and at least one dynamic attribute of the users, wherein the identifying the second cluster of users comprises:
      adjusting the calculated connection weight between a set of users to create an adjusted connection weight by:
         multiplying the calculated connection weight between the set of users by a predetermined factor when a respective dynamic attribute weight of the set of users is within a predetermined range; and
         dividing the calculated connection weight between the set of users by the predetermined factor when the respective dynamic attribute weight of the set of users is outside of the predetermined range; and
      identifying the second cluster of users based on the adjusted connection weight;
a comparing module, stored in memory, that compares the first cluster with the second cluster to identify an outlying user;
a designating module, stored in memory, that designates the outlying user as suspicious; and
at least one physical processor that executes the identifying module, the comparing module, and the designating module.

9. The system of claim 8, wherein the comparing further comprises comparing distances between locations of each user in the first cluster and the second cluster to identify the outlying user.

10. The system of claim 8, wherein the at least one static attribute is based on a user profile.

11. The system of claim 10, wherein the user profile comprises at least one of:
- a job title;
- a job grade;
- a job location;
- a job department;
- a country; and
- a primary language.

12. The system of claim 8, wherein the at least one dynamic attribute is based on user behavior.

13. The system of claim 12, wherein the user behavior comprises at least one of:
- a number of files accessed;
- a number of file permissions;
- a number of file reads;
- a number of file writes;
- a number of file creates;
- a number of file deletes;
- a number of file permission changes;
- a number of file renames;
- a number of files to which the user has access;
- a number of internet protocol addresses that the user accesses; and
- a number of files that the user owns.

14. The system of claim 8, further comprising a security module, stored in memory, that performs at least one security action in response to designating the outlying user as suspicious.

15. A non-transitory computer-readable medium comprising one or more computer-executable instructions that, when executed by at least one processor of a computing device, cause the computing device to:
calculate connection weights between users by adding respective static attribute weights of the users when the users have the same static attribute weights;
identify a first cluster of users based on the calculated connection weights;
identify a second cluster of users based on both at least one static attribute of the users and at least one dynamic attribute of the users, wherein the identifying the second cluster of users comprises:
   adjusting the calculated connection weight between a set of users to create an adjusted connection weight by:
      multiplying the calculated connection weight between the set of users by a predetermined factor when a respective dynamic attribute weight of the set of users is within a predetermined range; and
      dividing the calculated connection weight between the set of users by the predetermined factor when the respective dynamic attribute weight of the set of users is outside of the predetermined range; and
   identifying the second cluster of users based on the adjusted connection weight;
compare the first cluster with the second cluster to identify an outlying user; and
designate the outlying user as suspicious.

16. The non-transitory computer-readable medium of claim 15, wherein the computer-executable instructions that cause the computing device to compare the first cluster with the second cluster further comprise computer-executable instructions that cause the computing device to compare distances between locations of each user in the first cluster and the second cluster to identify the outlying user.

17. The non-transitory computer-readable medium of claim 15, wherein the at least one static attribute is based on a user profile.

18. The non-transitory computer-readable medium of claim 15, further comprising computer-executable instructions that cause the computing device to perform at least one security action in response to designating the outlying user as suspicious.

19. The non-transitory computer-readable medium of claim 17, wherein the user profile comprises at least one of:
   a job title;
   a job grade;
   a job location;
   a job department;
   a country; and
   a primary language.

20. The non-transitory computer-readable medium of claim 15, further comprising computer-executable instructions that cause the computing device to perform at least one security action in response to designating the outlying user as suspicious.

* * * * *

UNITED STATES PATENT AND TRADEMARK OFFICE
CERTIFICATE OF CORRECTION

PATENT NO. : 10,841,321 B1  
APPLICATION NO. : 15/472231  
DATED : November 17, 2020  
INVENTOR(S) : Anand Athavle Page 1 of 1

It is certified that error appears in the above-identified patent and that said Letters Patent is hereby corrected as shown below:

In the Claims

In Column 11, Line 41, Claim 8, after "both" delete "the".

Signed and Sealed this  
Ninth Day of February, 2021

Drew Hirshfeld  
*Performing the Functions and Duties of the*  
*Under Secretary of Commerce for Intellectual Property and*  
*Director of the United States Patent and Trademark Office*